(12) United States Patent
Lee

(10) Patent No.: US 11,095,815 B2
(45) Date of Patent: *Aug. 17, 2021

(54) IMAGE PROCESSING APPARATUS AND METHOD

(71) Applicant: HANWHA TECHWIN CO., LTD., Seongnam-si (KR)

(72) Inventor: Chang Min Lee, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,827

(22) Filed: Sep. 30, 2019

(65) Prior Publication Data

US 2020/0029019 A1    Jan. 23, 2020

Related U.S. Application Data

(63) Continuation of application No. 15/393,456, filed on Dec. 29, 2016, now Pat. No. 10,432,859.

(30) Foreign Application Priority Data

Oct. 6, 2016   (KR) ........................ 10-2016-0128866

(51) Int. Cl.
*H04N 5/232*       (2006.01)
*H04N 5/235*       (2006.01)
*H04N 5/355*       (2011.01)

(52) U.S. Cl.
CPC ....... *H04N 5/23245* (2013.01); *H04N 5/2351* (2013.01); *H04N 5/2353* (2013.01); *H04N 5/2355* (2013.01); *H04N 5/35581* (2013.01)

(58) Field of Classification Search
CPC ............. H04N 5/23245; H04N 5/2351; H04N 5/2353; H04N 5/2355; H04N 5/35581
See application file for complete search history.

(56) References Cited

U.S. PATENT DOCUMENTS

| 2006/0006767 A1 | 1/2006 | Fischer et al. |
| 2006/0067670 A1 | 3/2006 | Misawa |
| 2016/0006582 A1 | 1/2016 | Koch et al. |
| 2016/0065822 A1 | 3/2016 | Min et al. |

FOREIGN PATENT DOCUMENTS

CN          101909157 A          12/2010

OTHER PUBLICATIONS

European Office Action for Application No. EP 17150636.3 dated Apr. 6, 2020.

*Primary Examiner* — Ahmed A Berhan
(74) *Attorney, Agent, or Firm* — McLean IP Global; Jason Y. Pahng

(57) ABSTRACT

Provided is an image processing apparatus which generates a wide dynamic range (WDR) image using an image sensor. The image processing apparatus includes: an image sensor which outputs image data having a plurality of image channels; a mode setting unit which changes a photographing mode from a first mode in which a first number of sub-images are synthesized to a second mode in which a second number of sub-images are synthesized, based on luminance of the output image data; a register setting unit which changes a register value of the image sensor according to the second mode; and an image signal processor (ISP) which generates a result image by synthesizing the second number of sub-images from the image data according to the changed register value, wherein the second number of sub-images have different exposure times.

20 Claims, 10 Drawing Sheets

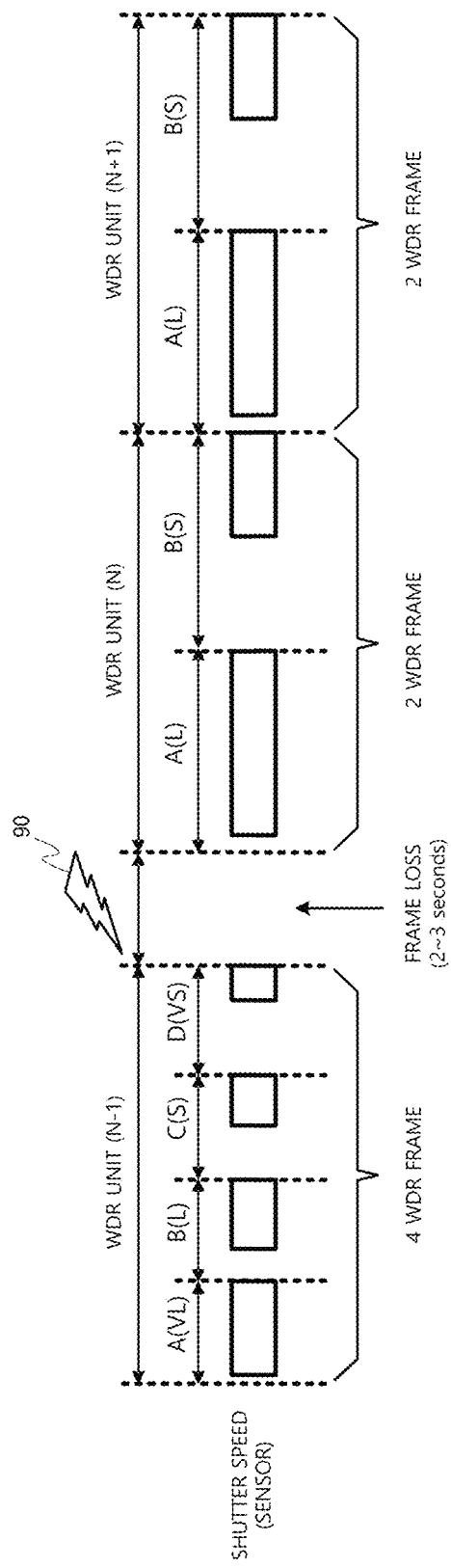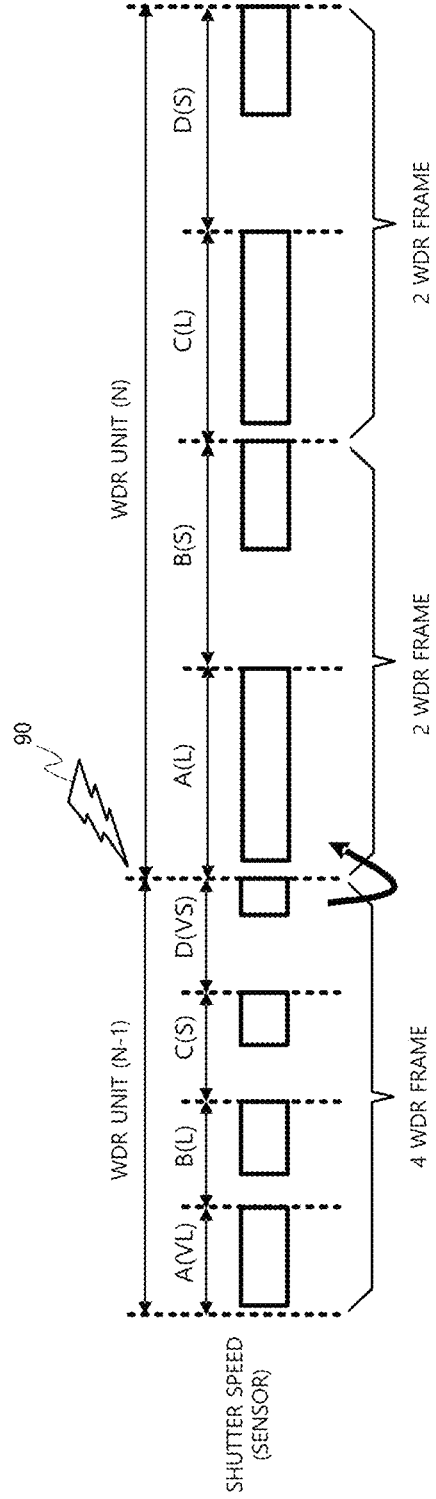

IMAGE PROCESSING APPARATUS AND METHOD

CROSS-REFERENCE TO THE RELATED APPLICATION

This application claims priority from Korean Patent Application No. 10-2016-0128866, filed on Oct. 6, 2016, in the Korean Intellectual Property Office, the disclosure of which is incorporated herein by reference in its entirety.

BACKGROUND

1. Field

Methods and apparatuses consistent with exemplary embodiments relate to an image processing apparatus, and more particularly, to an apparatus and method for generating a wide dynamic range (WDR) image using an image sensor.

2. Description of the Related Art

A solid-state pickup device such as a charge-coupled device (CCD) image sensor or a complementary metal oxide semiconductor (CMOS) image sensor used in a video camera or a digital camera performs photoelectric conversion. That is, such a device accumulates electric charge according to the amount of incident light and outputs an electrical signal corresponding to the accumulated charge. However, there is an upper limit to the amount of electric charge accumulated by a photoelectric converter. In addition, when more than a certain amount of light is received, the amount of accumulated charge reaches a saturation level, resulting in the so-called 'white noise' that causes a subject area with more than a certain level of brightness to have a saturated luminance level.

To prevent this phenomenon, a high shutter speed may be used for a bright subject to reduce an exposure time. The reduced exposure time may reduce the charge accumulation period of the photoelectric converter. Therefore, an electrical signal may be output before the amount of accumulated charge reaches the saturation level. Such processing makes it possible to output an image which accurately reproduces gray levels of the subject. However, if a subject having a mixture of bright and dark parts is taken with a high shutter speed, an exposure time may not be sufficient for the dark part. As a result, a signal-to-noise ratio (SNR) may be reduced, thereby deteriorating image quality.

To accurately reproduce luminance levels of a bright part and a dark part of a subject, it is required to achieve a high SNR by applying a long exposure time to pixels with a small amount of incident light while applying additional processing to pixels with a large amount of incident light to avoid the saturation.

To this end, a plurality of images may be taken successively with different exposure times and then synthesized together. Specifically, a long-exposed image and a short-exposed image may be taken successively and individually. Then, the long-exposed image is used for a dark part and the short-exposed image is used for a bright part in which whitening-out occurs in the long exposed image. This technology is called 'wide dynamic range (WDR)' technology.

A WDR image may be generated by synthesizing a plurality of images with different exposure times using the WDR technology. For example, a more natural image can be obtained using the WDR technology in various photographing environments such as taking a photograph in a place against the sun (e.g., near the window), taking a photograph of a scene with a mixture of bright and dark parts (e.g., a night view), and taking a photograph of a scene with a mixture of a bright part in the sun and a dark part in the shade (e.g., a sports event).

FIG. 1 illustrates an example of conventional WDR image generation technology. Referring to FIG. 1, an image sensor which supports up to 120 frames per second (fps) of shutter speed generates one WDR frame by synthesizing four sub-images. Although each of the four sub-images could be taken using 120 fps shutter speed, only up to 30 fps is allowed to each of the four sub-images because the sub-images are to be synthesized into one WDR frame. For example, the four sub-images may be taken with different shutter speeds (i.e., exposure times) of very long (VL), long (L), short (S), and very short (VS), respectively. Due to the different shutter speeds, the four sub-images have different luminance.

Thus, the WDR synthesis technology cannot fully utilize a maximum shutter speed. That is, in a 4WDR mode of FIG. 1, the exposure time of the image sensor is only about a quarter of the exposure time in a normal mode in which WDR is not used. In other words, the amount of light provided to the image sensor is reduced to ¼ compared to the normal mode. This shortage of light significantly reduces image quality of a final image if WDR is applied in a dark environment. In particular, the shortage of light increases a sensor gain, thereby sharply increasing noise.

SUMMARY

Aspects of the inventive concept provide an image processing apparatus and method which can prevent deterioration of image quality through a rapid change between various wide dynamic range (WDR) modes including a normal mode (no WDR synthesis mode) according to an environment in which an image is captured.

Aspects of the inventive concept also provide an image processing apparatus and method which support a seamless WDR mode change by minimizing a delay in the automatic WDR mode change.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of an exemplary embodiment, there is provided an image processing apparatus including: an image sensor configured to output image data having a plurality of image channels; at least one processor to implement: a mode setting unit configured to change a photographing mode from a first mode in which a first number of sub-images are synthesized to a second mode in which a second number of sub-images are synthesized, based on luminance of the output image data; a register setting unit configured to change a register value of the image sensor according to the second mode; and an image signal processor (ISP) configured to generate a result image by synthesizing the second number of sub-images from the image data according to the changed register value, wherein the second number of sub-images have different exposure times.

The register value may include a maximum shutter speed for each photographing mode and a shutter speed for each image channel. 4

The maximum shutter speed may be set in inverse proportion to a number of sub-images to be synthesized for generating the result image.

The number of image channels output from the image sensor may be constant regardless of the photographing mode.

The ISP may read the second number of image channels according to the second mode among the image channels included in the image data output from the image sensor and generates the result image by synthesizing the second number of sub-images.

The ISP may include: a channel writer configured to sequentially record in an input channel buffer the image channels included in the image data output from the image sensor according to the second mode; a channel reader configured to read the second number of image channels among the image channels recorded in the input channel buffer and record the second number of image channels in an output channel buffer; and a wide dynamic range (WDR) image generator configured to synthesize sub-images corresponding to the second number of image channels recorded in the output channel buffer.

The WDR image generator may include: a sub-image generation unit configured to generate the second number of sub-images respectively from the second number of image channels recorded in the output channel buffer; and an image synthesis unit configured to generate the result image by synthesizing the second number of sub-images.

The image synthesis unit may generate the result image by assigning a different weight to each of the second number of sub-images or to each area of each of the second number of sub-images.

Each of the first number and the second number may be an integer equal to or greater than 1.

Each of the first number and the second number may be a power of 2.

The first number is 4, and the second number may be 2 or 1.

The mode setting unit may determine the luminance of the output image data based on a mean of luminance of pixels included in the output image data.

The mode setting unit may determine the luminance of the output image data based on a proportion of dark pixels whose luminance is equal to or lower than a first predetermined level in the output image data or the proportion of bright pixels whose luminance is equal to or higher than a second predetermined level in the output image data.

According to another aspect of an exemplary embodiment, there is provided an image processing method including: outputting image data having a plurality of image channels using an image sensor; changing a photographing mode from a first mode in which a first number of sub-images are synthesized to a second mode in which a second number of sub-images are synthesized, based on luminance of the output image data; changing a register value of the image sensor according to the second mode; outputting modified image data corresponding to the changed register value; and generating a result image by synthesizing the second number of sub-images from the modified image data, wherein the second number of sub-images have different exposure times.

The register value may include a maximum shutter speed for each photographing mode and a shutter speed for each image channel.

The maximum shutter speed may be set in inverse proportion to a number of sub-images to be synthesized for generating the result image.

The number of image channels output from the image sensor may be constant regardless of the photographing mode.

The generating of the result image may include reading the second number of image channels according to the second mode among the image channels included in the modified image data and generating the result image by synthesizing the second number of sub-images.

The generating of the image may include: sequentially recording the image channels included in the modified image data in an input channel buffer; reading the second number of image channels among the image channels recorded in the input channel buffer; recording the second number of image channels in an output channel buffer; and synthesizing sub-images corresponding to the second number of image channels recorded in the output channel buffer.

The synthesizing of the second number of sub-images may include: generating the second number of sub-images respectively from the second number of image channels recorded in the output channel buffer; and generating the result image by synthesizing the second number of sub-images.

BRIEF DESCRIPTION OF THE DRAWINGS

These and/or other aspects will become apparent and more readily appreciated from the following description of the embodiments, taken in conjunction with the accompanying drawings in which:

FIG. 3 illustrates a process of switching from a 4WDR mode to a 2WDR mode by resetting a WDR image sensor and an image signal processor (ISP), according to an exemplary embodiment;

FIG. 4 illustrates a process of switching from a 4WDR mode to a 2WDR mode by changing a register value of a WDR image sensor according to an exemplary embodiment;

DETAILED DESCRIPTION OF THE EXEMPLARY EMBODIMENTS

Figure 1:
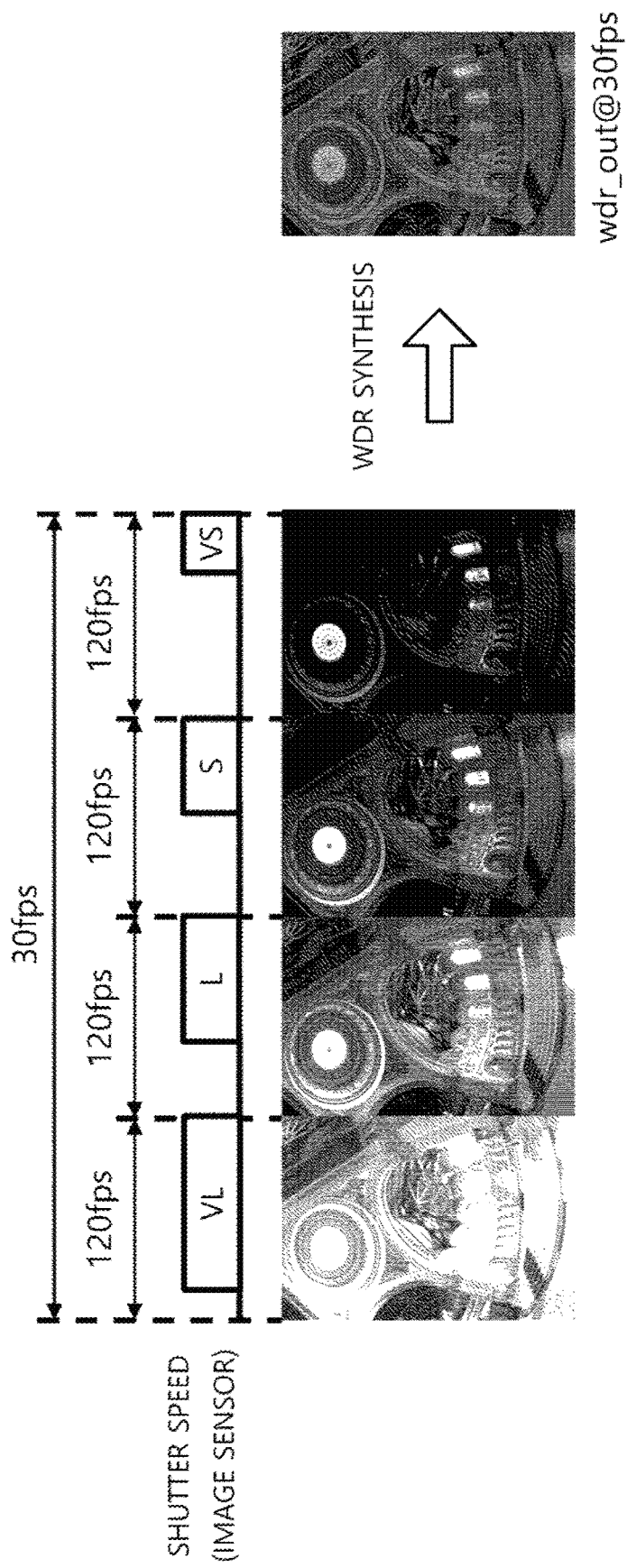
FIG. 1 illustrates a conventional wide dynamic range (WDR) image generation technology.

Advantages and features of the inventive concept and methods of accomplishing the same may be understood more readily by reference to the following detailed description of preferred exemplary embodiments and the accompanying drawings. The inventive concept may, however, be embodied in many different forms and should not be construed as being limited to the exemplary embodiments set forth herein. Rather, these exemplary embodiments are provided so that this disclosure will be thorough and complete and will fully convey the inventive concept to those skilled in the art, and the present inventive concept will only be defined by the appended claims. Throughout the specification, like reference numerals in the drawings denote like elements. Hereinafter, exemplary embodiments will be described in detail with reference to the accompanying drawings.

Figure 2:
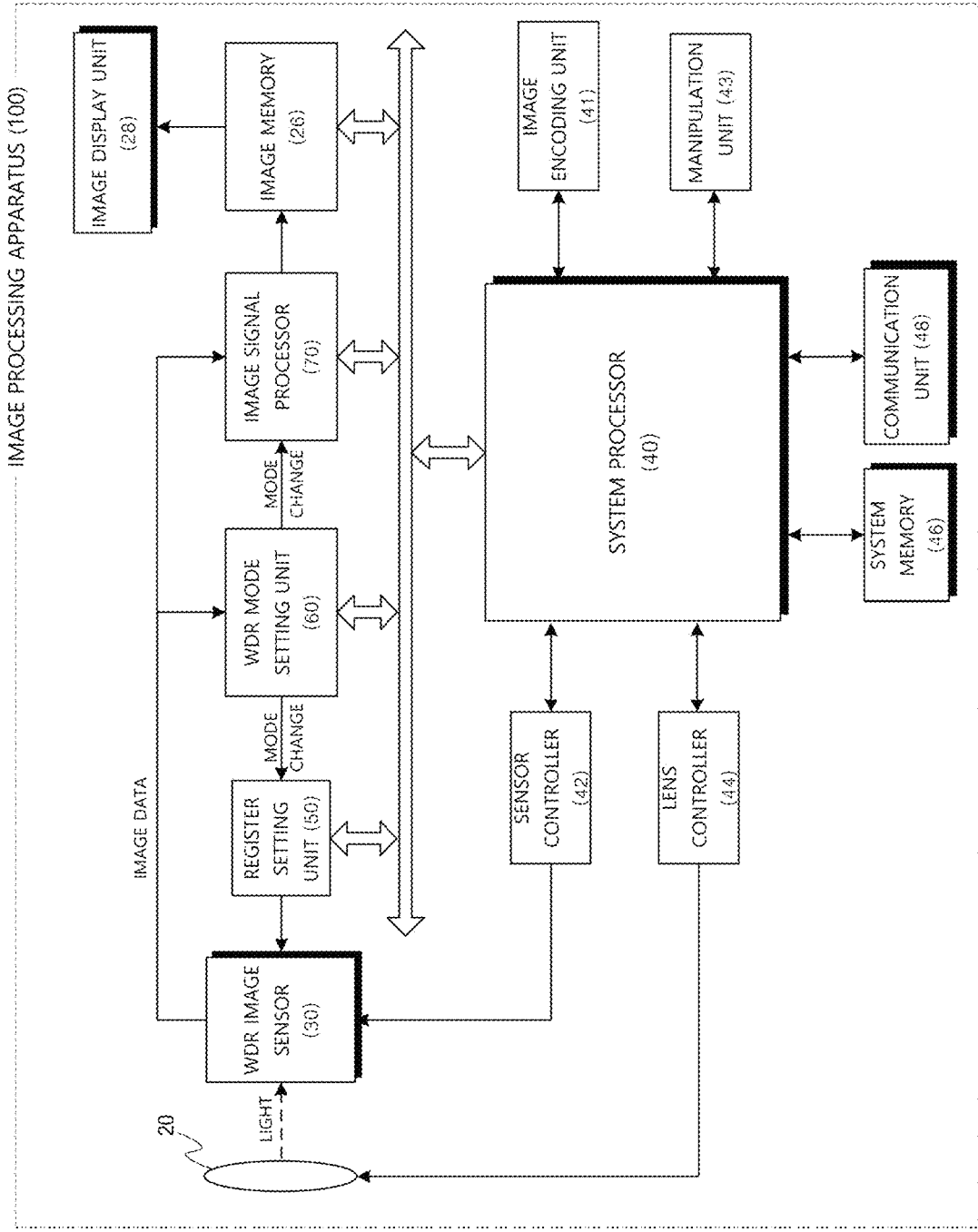
FIG. 2 is a block diagram of an image processing apparatus according to an exemplary embodiment.

FIG. 2 is a block diagram of an image processing apparatus 100 according to an exemplary embodiment.

Referring to FIG. 2, light reflecting from a subject is guided to a wide dynamic range (WDR) image sensor 30 by a photographing lens 20 and converted into image data (an electrical signal) by the WDR image sensor 30. The WDR image sensor 30 may support a WDR function. That is, the WDR image sensor 30 may provide a plurality of sub-images (e.g., four sub-images as in FIG. 1) corresponding to a plurality of image channels (image output channels). The sub-images are image data obtained under different photographing conditions and used as source images to generate one WDR image.

A WDR mode setting unit 60 may calculate luminance of the image data output from the WDR image sensor 30 and set an appropriate WDR mode based on the calculated luminance. That is, the WDR mode setting unit 60 may change modes from a first mode in which a first number of sub-images are synthesized to a second mode in which a second number of sub-images are synthesized based on the calculated luminance. For example, when a current mode is a normal mode in which one sub-image is generated (that is, WDR synthesis is bypassed because the number of sub-images is one), the WDR mode setting unit 60 may change the current mode to a 2WDR mode, in which two sub-images are synthesized, based on the calculated luminance. Specifically, when the current mode is a 4WDR mode in which four sub-images are synthesized, if the luminance is lower than a first reference value due to insufficient light input to the photographing lens 20, the current mode may be changed to the 2WDR mode in which two sub-images are synthesized. However, if the luminance is still too low in the 2WDR mode (e.g., if the luminance is even lower than a second reference value that is below the first reference value), the current mode may be changed to the normal mode in which WDR synthesis is disabled.

The luminance used as a criterion for changing modes may be the mean of luminance of pixels included in the output image data. Alternatively, the luminance of the output image data may be defined based on a ratio of the number of dark pixels whose luminance is equal to or lower than a predetermined level to the total number of pixels included in the output image data or based on a ratio of the number of bright pixels whose luminance is equal to or higher than a predetermined level to the total number of pixels included in the output image data. The luminance can also be defined in other ways as long as it can represent the luminance of the output image data.

When the WDR mode setting unit 60 determines to change the current WDR mode to a new WDR mode, the image processing apparatus 100 may start the new WDR mode by resetting not only the WDR image sensor 30 but also an image signal processor (ISP) 70.

Various modules (i.e., units, controllers, processors, etc.) of the image processing apparatus 100 shown in FIG. 2 may be implemented with one or more processors.

FIG. 3 illustrates a process of switching from the 4WDR mode to the 2WDR mode by resetting the WDR image sensor 30 and the ISP 70.

Referring to FIG. 3, since the current mode is the 4WDR mode, four sub-images A, B, C and D obtained under different photographing conditions form one WDR unit N−1. Here, a WDR unit refers to one WDR image obtained from a plurality of sub-images, and N−1, N or N+1 indicates a time sequence of the WDR unit. When the WDR mode setting unit 60 determines to change the current mode to the 2WDR mode as indicated by reference numeral 90, both the WDR image sensor 30 and the ISP 70 are reset. After the current mode is changed to the 2WDR mode, two sub-images A and B or C and D form one WDR unit N and/or N+1.

To change WDR modes in this way, the ISP 70 should be reset as described above, and normally it takes a considerable time (approximately 2 to 3 seconds) to reset the ISP 70. Since no image is generated during that time, an output video may be temporarily frozen. This cannot only cause inconvenience to a user but also lead to a reduction in the performance and quality of the apparatus 100.

Therefore, exemplary embodiments in which WDR modes can be changed rapidly without the need to wait until the ISP 70 is reset will hereinafter be described.

In FIG. 2, when the WDR mode setting unit 60 determines to change the current mode to another mode (i.e., the second mode), a sensor controller 42 changes a register value of the WDR image sensor 30 according to the second mode. Here, the register value is a parameter used by the sensor controller 42 to control various photographing conditions of the WDR image sensor 30. Preferably, the register value may include a maximum shutter speed Vmax and a shutter speed set for each image channel. The maximum shutter speed Vmax is a maximum exposure time that can be secured by one image channel, and the shutter speed set for each image channel is a shutter speed (very long (VL), long (L), short (S), very short (VS), etc.) actually allocated to each image channel. There is virtually no time delay in changing the register value of the WDR image sensor 30, compared to resetting the ISP 70 as in FIG. 3.

FIG. 4 illustrates a process of switching from the 4WDR mode to the 2WDR mode by changing the register value of the WDR image sensor 30.

Referring to FIG. 4, since the current mode is the 4WDR mode, four sub-images A, B, C and D obtained under different photographing conditions form one WDR unit N−1. When the WDR mode setting unit 60 determines to change the current mode to the 2WDR mode as indicated by reference numeral 90, a register setting unit 50 changes the register value of the WDR image sensor 30. The register values may include the maximum shutter speed Vmax and the shutter speed set for each image channel. In this example, the maximum shutter speed Vmax may be set to twice a current maximum shutter speed Fs of each image channel, and two shutter speeds are alternately allocated to the image channels. The register setting unit 50 may control the accumulation time of an electronic shutter by controlling the reset timing of the WDR image sensor 30 and change the register value accordingly.

Therefore, in FIG. 4, the shutter speeds of the image channels A, B, C and D may be set to L, S, L, and S, respectively. However, since the ISP 70 has not been reset for a mode change, the number of image channels output from the WDR image sensor 30, i.e., the number of image channels included in a WDR unit N, is still four. If the ISP 70 is reset as in FIG. 3, the number of image channels included in a WDR unit is reduced to two.

In FIG. 4, after the register setting unit 50 changes the register value, the current mode can be changed to the 2WDR mode virtually without a delay. That is, one 2WDR image frame can be obtained by synthesizing the first two A and B of the four image channels A, B, C and D, and another 2WDR image frame can be obtained by synthesizing the other two image channels C and D. Therefore, while two WDR units N−1 and N are illustrated in FIG. 4, the number of WDR image frames obtained from the two WDR units N−1 and N is three as in FIG. 3.

Figure 5:
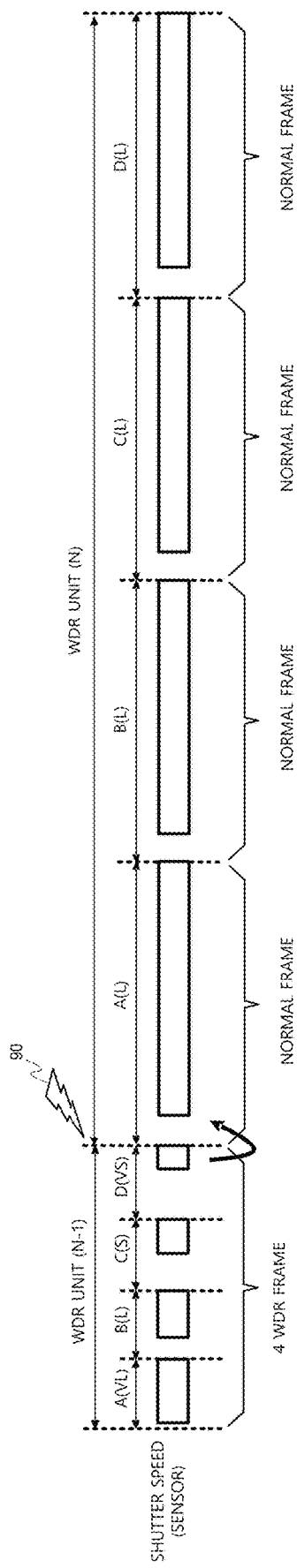
FIG. 5 illustrates a process of switching from a 4WDR mode to a normal mode by changing a register value of a WDR image sensor according to an exemplary embodiment.

FIG. 5 illustrates a process of switching from the 4WDR mode to the normal mode by changing the register value of the WDR image sensor 30.

Referring to FIG. 5, since the current mode is the 4WDR mode, four sub-images A, B, C and D obtained under different photographing conditions form one WDR unit N−1. When the WDR mode setting unit 60 determines to change the current mode to the normal mode (no WDR mode or 1WDR mode) as indicated by reference numeral 90, the register setting unit 50 sets the maximum shutter speed Vmax of the WDR image sensor 30 to four times the current maximum shutter speed Fs of each image channel and allocates the same shutter speed to the four image channels. Therefore, the shutter speeds of the image channels A, B, C and D may all be set to L. Even in this case, the number of image channels output from the WDR image sensor 30, i.e., the number of image channels included in a WDR unit N, is still four.

After the register setting unit 50 changes the register value, the current mode can be changed to the normal mode virtually without a delay. That is, four image frames (normal frames) can be obtained respectively from the four image channels A, B, C and D set to the same exposure time (L) without a synthesizing process. Therefore, while two WDR units N−1 and N are illustrated in FIG. 5, the number of image frames obtained from the two WDR units N−1 and N is five.

After the register value of the WDR image sensor 30 is changed according to a mode change by the WDR mode setting unit 60, the WDR image sensor 30 outputs modified image data having the same number of image channels as before but having the changed parameter (e.g., shutter speed), as illustrated in FIGS. 4 and 5. Here, the maximum shutter speed Vmax may be set in inverse proportion to the number of sub-images corresponding to a new WDR mode. For example, in FIG. 4, the maximum shutter speed Vmax is set to twice the current maximum shutter speed Fs according to a mode change from the 4WDR mode to the 2WDR mode. In FIG. 5, the maximum shutter speed Vmax is set to four times the current maximum shutter speed Fs according to a mode change from the 4WDR mode to the normal mode.

To completely change WDR modes, it is required to change the operation of the ISP 70 as well as the register value of the WDR image sensor 30. This is because the ISP 70 has to generate a WDR image by synthesizing the changed number (i.e., the second number) of sub-images from the modified image data. In the example of FIG. 5, the ISP 70 may read a plurality of image channels A, B, C and D included in the image data output from the WDR image sensor 30. Unless the ISP 70 is reset, the ISP 70 may use the four sub-images instead of two of them to generate one WDR image, even after the photographing mode, i.e., WDR mode, has changed to a new mode, i.e., 4WDR mode.

Figure 6:
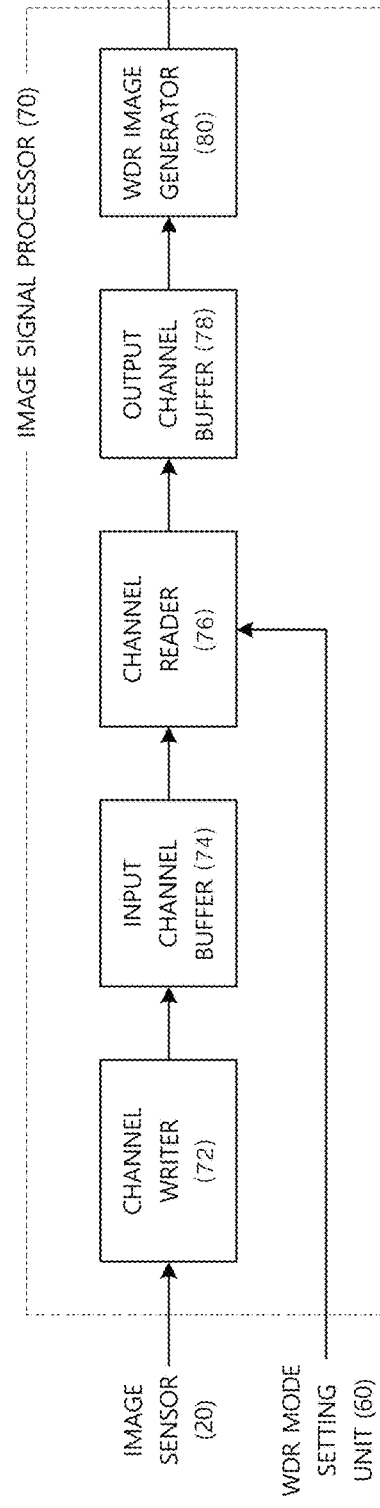
FIG. 6 is a detailed block diagram of an ISP according to an exemplary embodiment.

FIG. 6 is a detailed block diagram of the ISP 70 according to an exemplary embodiment. The ISP 70 may include a channel writer 72, an input channel buffer 74, a channel reader 76, an output channel buffer 78, and a WDR image generator 80. The input channel buffer 74 and the output channel buffer 78 can be provided outside the ISP 70. Each of the input channel buffer 74 and the output channel buffer 78 may be implemented as a storage medium for temporarily storing data, such as a random access memory (RAM), a flash memory, a solid state disk (SSD), etc.

The channel writer 72 sequentially records a plurality of image channels included in image data output from the WDR image sensor 30 according to a current mode in the input channel buffer 74. The channel reader 76 reads the image channels recorded in the input channel buffer 74 in units of the second number of image channels according to mode change information. The mode change information may indicate that the WDR mode has changed to the second mode, and may be provided by the WDR mode setting unit 60. Further, the channel reader 76 record the read image channels in the output channel buffer 78. Then, the WDR image generator 80 synthesizes sub-images corresponding to the second number of image channels recorded in the output channel buffer 78 and outputs the synthesis result to outside the ISP 70.

Figure 7:
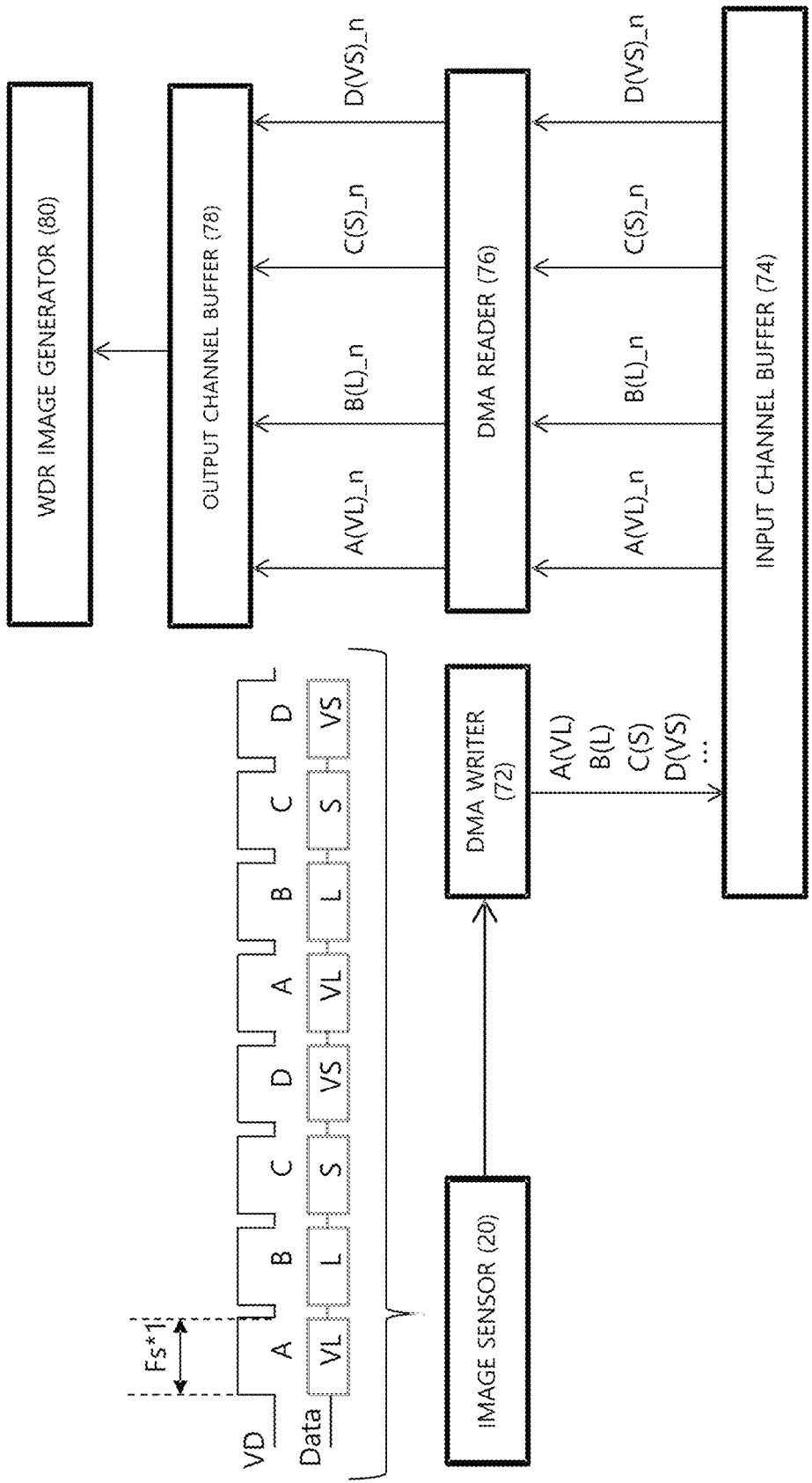
FIG. 7 illustrates an ISP operating in a 4WDR mode, according to an exemplary embodiment.
Figure 8:
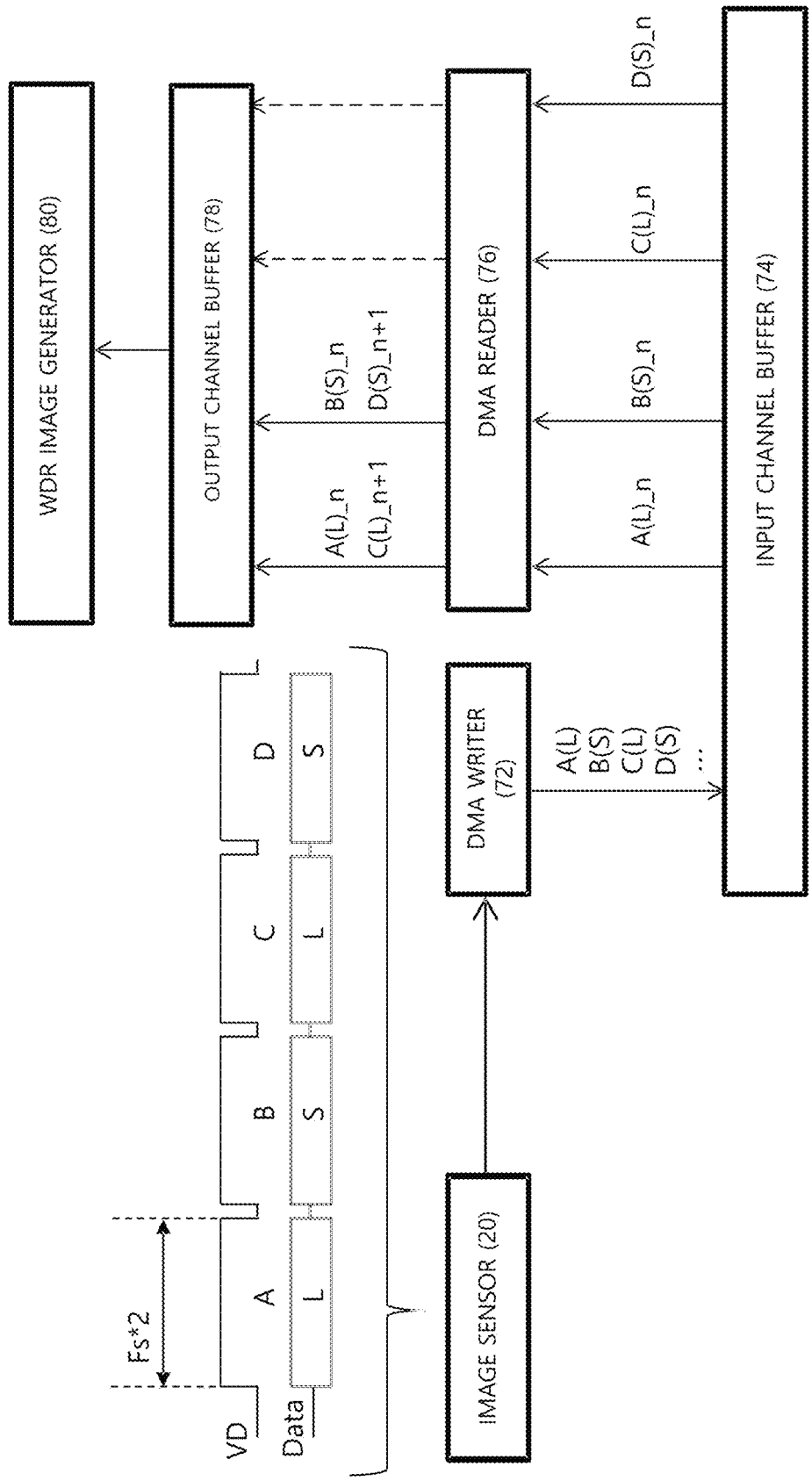
FIG. 8 illustrates an ISP operating in a 2WDR mode, according to an exemplary embodiment.
Figure 9:
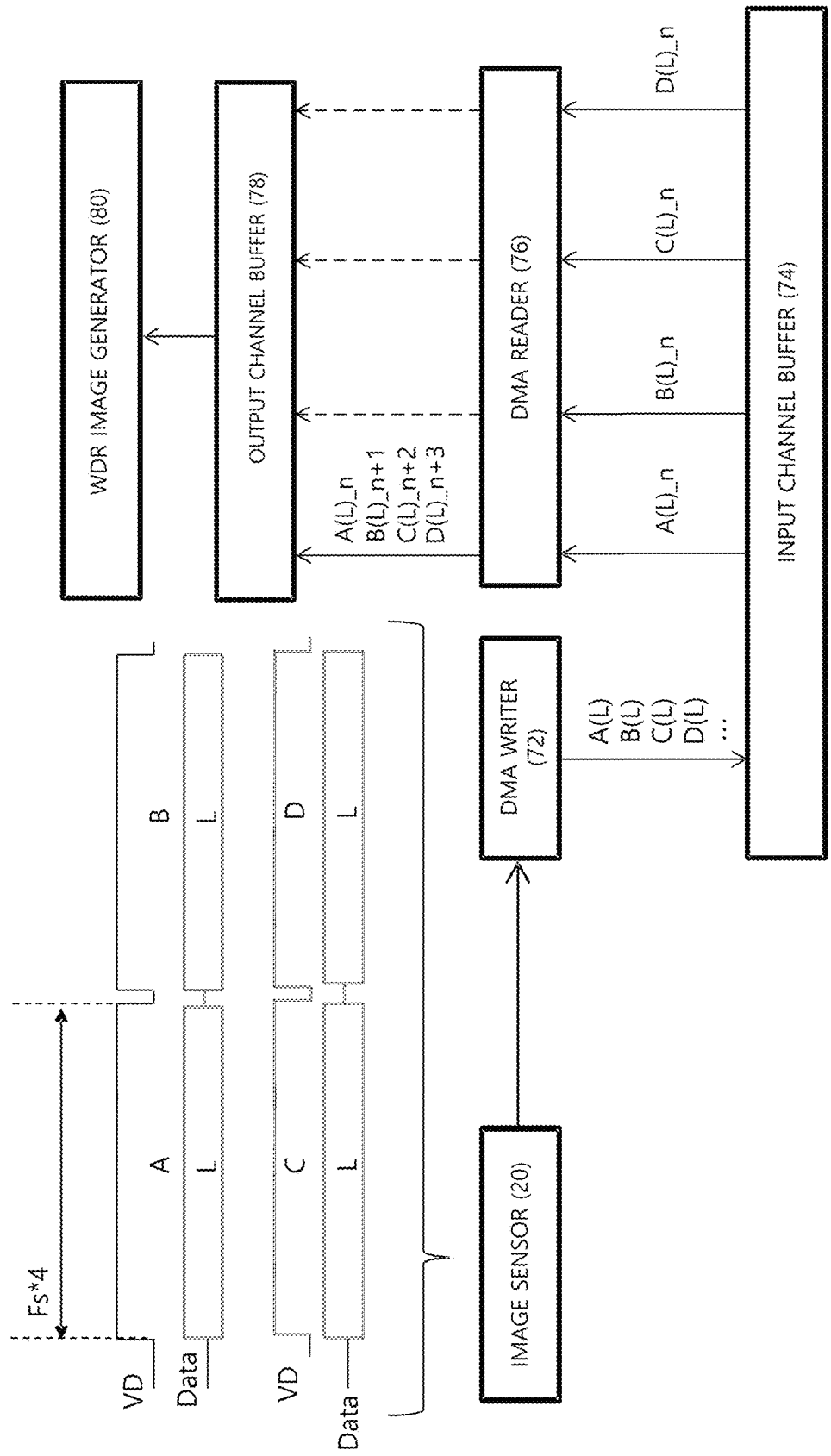
FIG. 9 illustrates an ISP operating in a normal mode, according to an exemplary embodiment.

FIGS. 7 through 9 respectively illustrate, in more detail, the operation of the ISP 70 in the 4WDR mode, the 2WDR mode, and the normal mode. Referring to FIG. 7, in the 4WDR mode, the WDR image sensor 30 outputs image data having different shutter speeds (VL, L, S, and VS) for four image channels A, B, C and D in response to a voltage VD applied to the WDR image sensor 30. Here, a direct memory access (DMA) writer 72 (or the channel writer) sequentially records the image channels A, B, C and D included in the image data according to the current mode in the input channel buffer 74. A DMA reader 76 (or the channel reader) reads each of the four image channels A, B, C and D and stores the read four image channels A, B, C and D, as they are, in the output channel buffer 78. Accordingly, the WDR image generator 80 generates one WDR image by synthesizing four sub-images corresponding to the four image channels A, B, C and D stored in the output channel buffer 78. Here, the arrangement of the channels A, B, C and D stored in the input channel buffer 74 and the arrangement of the channels A, B, C and D stored in the output channel buffer 78 are the same, and a frame number n of the final WDR image is constant.

Referring to FIG. 8, in the 2WDR mode, the WDR image sensor 30 outputs image data having two shutter speeds (L, S, L and S) alternately allocated to four image channels A, B, C and D in response to the voltage VD applied to the WDR image sensor 30. Here, a period of time during which the voltage VD applied to the WDR image sensor 30 is maintained. That is, the maximum shutter speed Vmax is set to twice the current maximum shutter speed Fs (i.e., Fs×2) in the 4WDR mode by the register setting unit 50.

The DMA writer 72 sequentially records the image channels A, B, C and D included the image data output by the image sensor 20, according to the current mode in the input channel buffer 74. The DMA reader 76 reads each of the four image channels A, B, C and D and stores the read four image channels A, B, C and D in the output channel buffer 78 in units of two channels. Accordingly, the WDR image generator 80 generates an $n^{th}$ WDR image by synthesizing two sub-images corresponding to two image channels A and B stored in the output channel buffer 78. In addition, the WDR image generator 80 generates an $(n+1)^{th}$ WDR image by synthesizing two sub-images corresponding to the remaining two image channels C and D stored in the output channel buffer 78.

Referring to FIG. 9, in the normal mode, the WDR image sensor 30 outputs image data having the same shutter speed (L) for four image channels A, B, C and D in response to the voltage VD applied to the WDR image sensor 30. Here, the period of time during which the voltage VD applied to the WDR image sensor 30 is maintained. That is, the maximum shutter speed Vmax is set to four times the current maximum shutter speed Fs (Fs×4) in the 4WDR mode by the register setting unit 50.

The DMA writer 72 sequentially records the image channels A, B, C and D included the image data according to the current mode in the input channel buffer 74. The DMA reader 76 reads each of the four image channels A, B, C and D and stores the read four image channels A, B, C and D in the output channel buffer 78 in units of one channel. Accordingly, the WDR image generator 80 generates an $n^{th}$ normal image from one image channel A stored in the output channel buffer 78. Similarly, the WDR image generator 80 generates an $(n+1)^{th}$ normal image, an $(n+2)^{th}$ normal image and an $(n+3)^{th}$ normal image from the image channel B, the image channel C and the image channel D, respectively.

Figure 10:
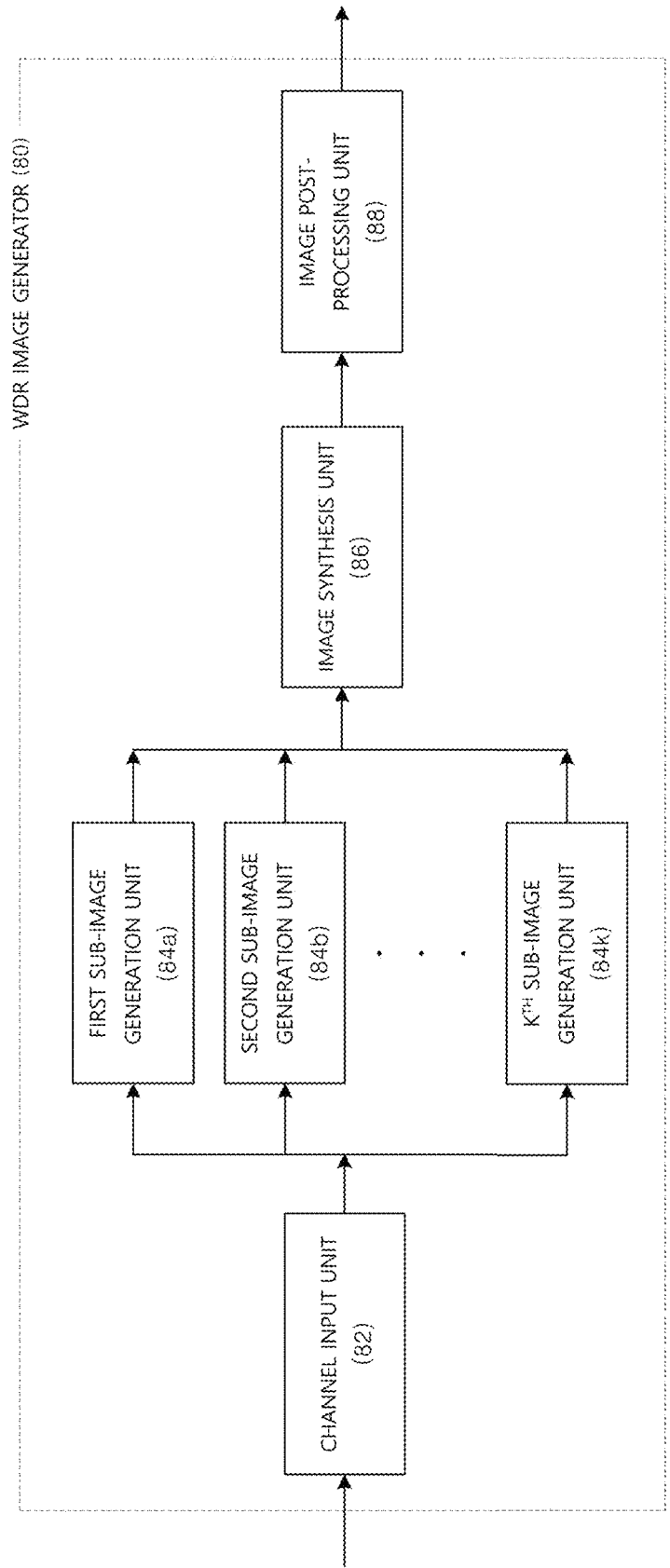
FIG. 10 is a block diagram of a WDR image generator according to an exemplary embodiment.

FIG. 10 is a detailed block diagram of the WDR image generator 80 according to an exemplary embodiment. The WDR image generator 80 may include a channel input unit 82, sub-image generation units 84a through 84k, an image synthesis unit 86, and an image post-processing unit 88.

The channel input unit 82 sequentially receives the second number of image channels recorded in the output channel buffer 78 according to the second mode. The sub-image generation units 84a through 84k generate the second number of sub-images from the second number of image channels sequentially input to the channel input unit 82. The image synthesis unit 86 generates a WDR image by synthesizing pixels of the second number of sub-images. Here, the pixels may have, but not limited to, an RGB data format, a YUV data format, or an YCbCr data format. In addition, the image post-processing unit 88 post-processes the WDR image generated by the image synthesis unit 86. The post-processing may include, but is not limited to, white balance adjustment, gamma processing, gain adjustment, etc.

Figure 11:
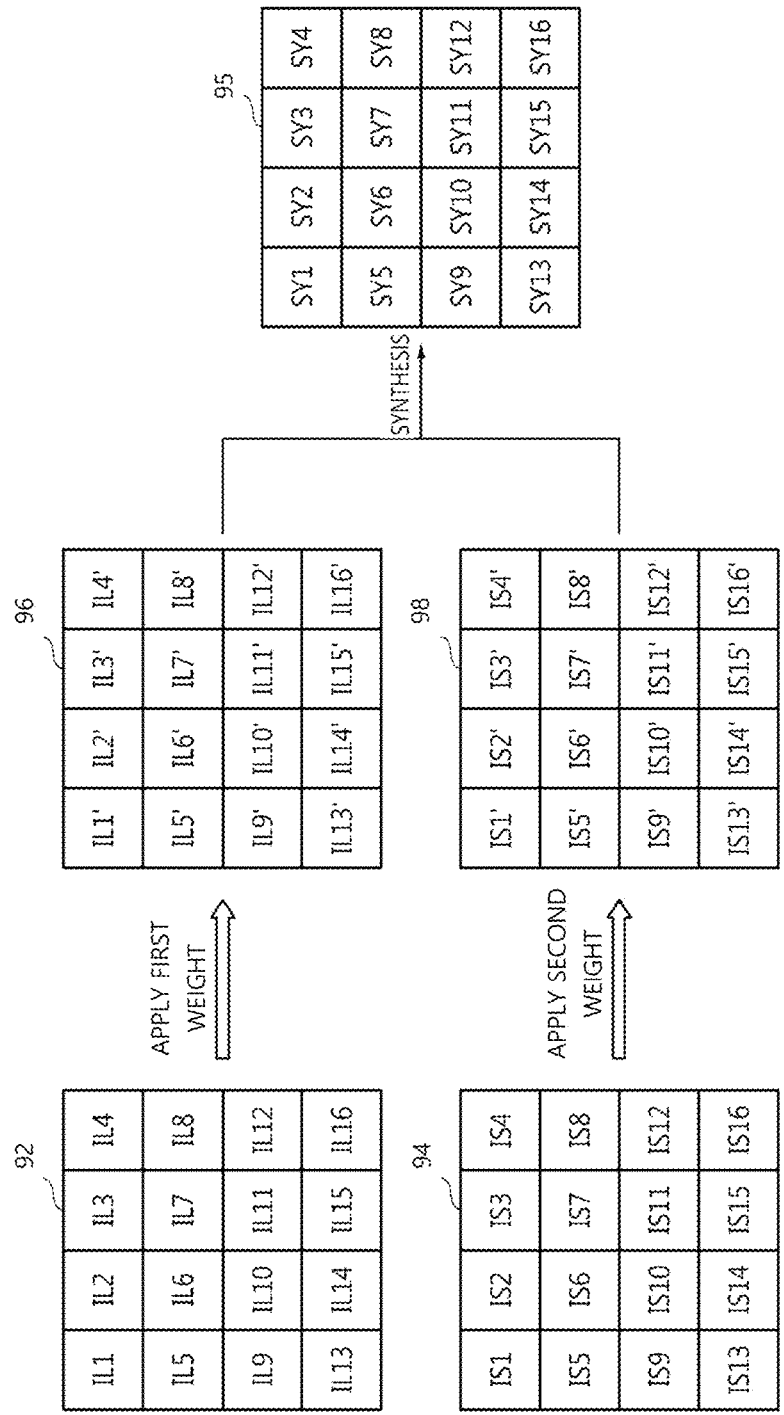
FIG. 11 illustrates a process of synthesizing sub-images using an image synthesis unit according to an exemplary embodiment.

FIG. 11 illustrates a process of synthesizing sub-images using the image synthesis unit 86.

Referring to FIG. 11, the first sub-image generation unit 84a generates a first sub-image taken with a relatively long exposure time, i.e., slow shutter speed, and the second sub-image generation unit 84b generates a second sub-image 94 taken with a relatively short exposure time, i.e., fast shutter speed.

The image synthesis unit 86 obtains a first weighted sub-image 96 by applying a first weight to the first sub-image 92 and obtains a second weighted sub-image 98 by applying a second weight to the second sub-image 94. Then, the image synthesis unit 86 generates one WDR image 95 by adding corresponding pixels in the first and second weighted sub-images 96 and 98. Here, the sum of the first weight and the second weight may be 1. A weight may be given to each sub-image or to each area (or block) of a sub-image. In FIG. 11, two sub-images are synthesized. However, two or other numbers of sub-images can be synthesized in the same way as described above.

Referring back to FIG. 2, a WDR image (a still image or a moving image) generated by the ISP 70 may be stored in an image memory 26. An image display unit 28 may be a liquid crystal display (LCD), an organic light-emitting diode (OLED), a cathode ray tube (CRT), etc. and display the WDR image recorded in the image memory 26 on the screen. In addition, the image display unit 28 may be turned on or off by a manipulation unit 43.

An image encoding unit 41 may read the WDR image stored in the image memory 26, compress the read WDR image, and store the compressed WDR image again in the image memory 26.

The manipulation unit 43 is a unit used to input various instructions of a system processor 40. The manipulation unit 43 may be implemented in the form of a switch, a dial, a touch panel, a pointing device based on eye detection, a voice recognition device, or a combination of the same. Using the manipulation unit 43, a user can set various functions such as power on/off, WDR mode on/off, zoom in/out, and on/off of the image display unit 28.

The sensor controller 42 may control a mechanical or electronic shutter included in the WDR image sensor 30. In addition, the sensor controller 42 may be linked with a flash to control a flashing function. A lens controller 44 may control the focus or zoom magnification of the photographing lens 20.

The system processor 40 may control overall operations of the image processing apparatus 100. Programs executed by the system processor 40 are recorded in a system memory 46 and executed as they are read sequentially. In addition, the system memory 46 may include an area which records system information and an area which records user setting information. Therefore, various information or settings can be read and restored when the image processing apparatus 100 is operated. The system memory 46 may be implemented as a RAM, a flash memory, or an SSD.

A communication unit 48 has a communication function such as universal serial bus (USB), IEEE1394, local area network (LAN), etc. The communication unit 48 may receive a control signal from a device different from the image processing apparatus 100 or transmit the generated WDR image to the device.

Each component described above with reference to FIGS. 2, 6 and 10 may be implemented as a software component, such as a task, a class, a subroutine, a process, an object, an execution thread or a program performed in a predetermined region of a memory, or a hardware component, such as a Field Programmable Gate Array (FPGA) or Application Specific Integrated Circuit (ASIC). In addition, the components may be composed of a combination of the software and hardware components. The components may be reside on a computer-readable storage medium or may be distributed over a plurality of computers.

And each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 12:
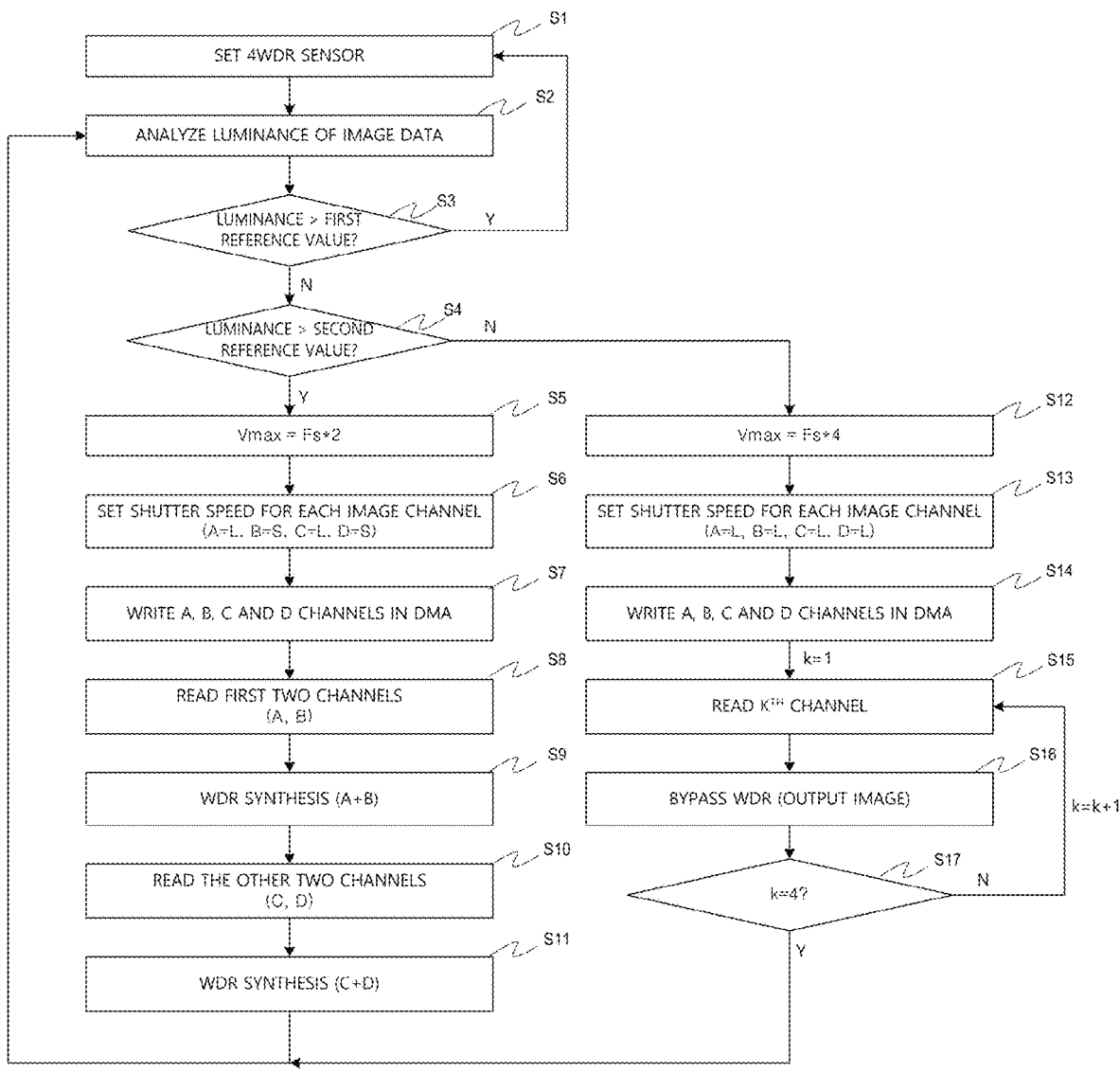
FIG. 12 is a flowchart illustrating an image processing method according to an exemplary embodiment.

FIG. 12 is a flowchart illustrating an image processing method performed by the image processing apparatus 100 according to an exemplary embodiment.

Referring to FIG. 12, the image processing apparatus 100 sets the WDR image sensor 30 and the ISP 70 to a 4WDR mode (operation S1). The WDR mode setting unit 60 analyses luminance of image data output from the WDR image sensor 30 (operation S2) and compares the luminance with a first reference value and a second reference value smaller than the first reference value (operations S3 and S4). If the luminance is greater than both the first and second reference values, the 4WDR mode is maintained (operation S1). If the luminance is between the first reference value and the second reference value, operation S5 is performed. If the luminance is smaller than the second reference value, operation S12 is performed.

In operation S5, the register setting unit 50 sets a maximum shutter speed Vmax of the WDR image sensor 30 to twice a current maximum shutter speed Fs (operation S5) and sets shutter speeds of four image channels A, B, C and D to L, S, L and S, respectively (operation S6).

Here, the channel writer 72 of the ISP 70 records the four channels A, B, C and D in the input channel buffer 74 (operation S7), and the channel reader 76 reads the first two A and B of the four channels A, B, C and D (operation S8). The WDR image generator 80 generates one WDR image by synthesizing two sub-images included in the two channels A and B (operation S9). Similarly, the channel reader 78 reads the other two C and D of the four channels A, B, C and D (operation S10). The WDR image generator 80 generates another WDR image by synthesizing two sub-images included in the two channels C and D (operation S11). Then, operation S2 is performed again.

In operation S12, the register setting unit 50 sets the maximum shutter speed Vmax of the WDR image sensor 30 to four times the current maximum shutter time Fs (operation S12) and sets all of the shutter speeds of the fourth image channels A, B, C and D to L (operation S13).

Here, the channel writer 72 of the ISP 70 records the four channels A, B, C and D in the input channel buffer 74 (operation S14), and the channel reader 76 reads the first channel A among the fourth channels A, B, C and D (operation S15). In this case, since only one sub-image exists, the WDR synthesis process of the WDR image generator 80 is bypassed. Therefore, the single sub-image is output, as it is, as a normal image from the ISP 70 (operation S16). Then, the remaining channels B, C and D are sequentially read one by one (operation S15), and normal images are output (operation S16). After the last one of the four channels A, B, C and D is processed (Y in operation S17), operation S2 is performed again.

In the above exemplary embodiments, photographing mode switches among the 4WDR mode, the 2WDR mode, and the normal mode (non-WDR mode). However, the inventive concept is not limited to this example and also applicable to a switch between WDR modes in which arbitrary numbers of sub-images are synthesized. In addition, the inventive concept is applicable to a mode change not only to a WDR mode in which a smaller number of sub-images are synthesized but also to a WDR mode in which a greater number of sub-images are synthesized. For example, if the mode change process of FIG. 4 or FIG. 5 is performed in the reverse order, a mode change to a WDR mode in which a greater number of sub-images are synthesized can be fully accomplished.

In addition, in the normal mode, one sub-image is not synthesized. In other words, the WDR synthesis process is bypassed. However, it should be understood that the normal mode has been described as a process of synthesizing one sub-image for the sake of consistency in technical expression.

According to an image processing apparatus and method of the inventive concept, it is possible to minimize deterioration of image quality by adaptively varying a photographing mode according to an environment in which an image is captured.

In addition, it is possible to change modes between various WDR modes (including a normal mode) simply by changing a register value of an image sensor without the need to reset an ISP for each mode change.

Therefore, since there is no frame loss due to a delay in a mode change between various WDR modes, a natural output image can be obtained.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 2 and 6-10 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

In concluding the detailed description, those skilled in the art will appreciate that many variations and modifications can be made to the preferred embodiments without substantially departing from the principles of the inventive concept.

Therefore, the exemplary embodiments disclosed herein are used in a generic and descriptive sense only and not for purposes of limitation.

What is claimed is:

1. An image processing apparatus comprising:
   an image sensor configured to output image data having a plurality of image channels;
   at least one processor configured to implement a mode setting unit which changes a photographing mode from a first mode in which a first number of sub-images are synthesized to a second mode in which a second number of sub-images are synthesized, based on luminance of the output image data;
   wherein the second number is less than or greater than the first number; and
   an image signal processor (ISP) configured to generate a result image by synthesizing the second number of sub-images from the image data,
   wherein the number of image channels output from the image sensor is constant regardless of the photographing mode.

2. The apparatus of claim 1, wherein the at least one processor configured to further implement a register setting unit which changes a register value of the image sensor according to the second mode,
   wherein the image signal processor (ISP) configured to generate the result image according to the changed register value, and
   wherein the register value comprises a maximum shutter speed for each photographing mode and a shutter speed for each image channel.

3. The apparatus of claim 2, wherein the maximum shutter speed is set in inverse proportion to a number of sub-images to be synthesized for generating the result image.

4. The apparatus of claim 1, wherein the ISP configured to read the second number of image channels according to the second mode among the image channels included in the image data output from the image sensor and generate the result image by synthesizing the second number of sub-images.

5. The apparatus of claim 4, wherein the ISP is configured to implement:
   a channel writer which sequentially records in an input channel buffer the image channels included in the image data output from the image sensor according to the second mode;
   a channel reader which reads the second number of image channels among the image channels recorded in the input channel buffer and records the second number of image channels in an output channel buffer; and
   a wide dynamic range (WDR) image generator which synthesizes sub-images corresponding to the second number of image channels recorded in the output channel buffer.

6. The apparatus of claim 5, wherein the WDR image generator comprises:
   a sub-image generation unit configured to generate the second number of sub-images respectively from the second number of image channels recorded in the output channel buffer; and
   an image synthesis unit configured to generate the result image by synthesizing the second number of sub-images.

7. The apparatus of claim 6, wherein the image synthesis unit is configured to generate the result image by assigning a different weight to each of the second number of sub-images or to each area of each of the second number of sub-images.

8. The apparatus of claim 1, wherein the mode setting unit determines the luminance of the output image data based on a mean of luminance of pixels included in the output image data.

9. The apparatus of claim 1, wherein the mode setting unit determines the luminance of the output image data based on a proportion of dark pixels whose luminance is equal to or lower than a first predetermined level in the output image data or the proportion of bright pixels whose luminance is equal to or higher than a second predetermined level in the output image data.

10. An image processor for processing image data having a plurality of image channels received from an image sensor, the image processor configured to implement to:
    change a photographing mode from a first mode in which a first number of sub-images are synthesized to a second mode in which a second number of sub-images are synthesized, based on luminance of the received image data;
    wherein the second number is less than or greater than the first number;
    change a register value of the image sensor according to the second mode and sends the changed register value of the image sensor to the image sensor; and
    generate a result image by synthesizing the second number of sub-images from the image data according to the changed register value,
    wherein the number of image channels output from the image sensor is constant regardless of the change from the first number to the second number.

11. The apparatus of claim 10, wherein the register value comprises a maximum shutter speed for each photographing mode and a shutter speed for each image channel, and
    wherein the maximum shutter speed is set in inverse proportion to a number of sub-images to be synthesized for generating the result image.

12. An image processing method comprising:
    outputting image data having a plurality of image channels using an image sensor;
    changing a photographing mode from a first mode in which a first number of sub-images are synthesized to a second mode in which a second number of sub-images are synthesized, based on luminance of the output image data;
    changing a register value of the image sensor according to the second mode;
    outputting modified image data corresponding to the changed register value; and
    generating a result image by synthesizing the second number of sub-images from the modified image data,
    wherein the second number of sub-images have different exposure times and wherein the second number is less than or greater than the first number.

13. The method of claim 12, wherein the register value comprises a maximum shutter speed for each photographing mode and a shutter speed for each image channel.

14. The method of claim 13, wherein the maximum shutter speed is set in inverse proportion to a number of sub-images to be synthesized for generating the result image.

15. The method of claim 12, wherein the generating of the result image comprises reading the second number of image channels according to the second mode among the image channels included in the modified image data and generating the result image by synthesizing the second number of sub-images.

16. The method of claim 12, wherein the generating of the image comprises:

sequentially recording the image channels included in the modified image data in an input channel buffer;

reading the second number of image channels among the image channels recorded in the input channel buffer;

recording the second number of image channels in an output channel buffer; and synthesizing sub-images corresponding to the second number of image channels recorded in the output channel buffer.

17. The method of claim 16, wherein the synthesizing of the second number of sub-images comprises:

generating the second number of sub-images respectively from the second number of image channels recorded in the output channel buffer; and generating the result image by synthesizing the second number of sub-images.

18. A camera device comprising:

an image sensor configured to capture image data having a plurality of image channels; and a processor configured to change a photographing mode from a first mode in which a first number of sub-images are synthesized to a second mode in which a second number of sub-images are synthesized, generate a result image by synthesizing the second number of sub-images from the image data and provide the result image to a screen, wherein the second number is less than or greater than the first number, and wherein there is substantially no frame loss originated from a time delay in the result image even when the photographing mode is changed from the first mode to the second mode.

19. The camera of claim 18, wherein the processor further configured to change a register value of the image sensor according to the second mode and generate the result image according to the changed register value.

20. The camera of claim 19, wherein the register value comprises a maximum shutter speed for each photographing mode and a shutter speed for each image channel, and wherein the maximum shutter speed is set in inverse proportion to a number of sub-images to be synthesized for generating the result image.

* * * * *